United States Patent Office 2,967,244
Patented Jan. 3, 1961

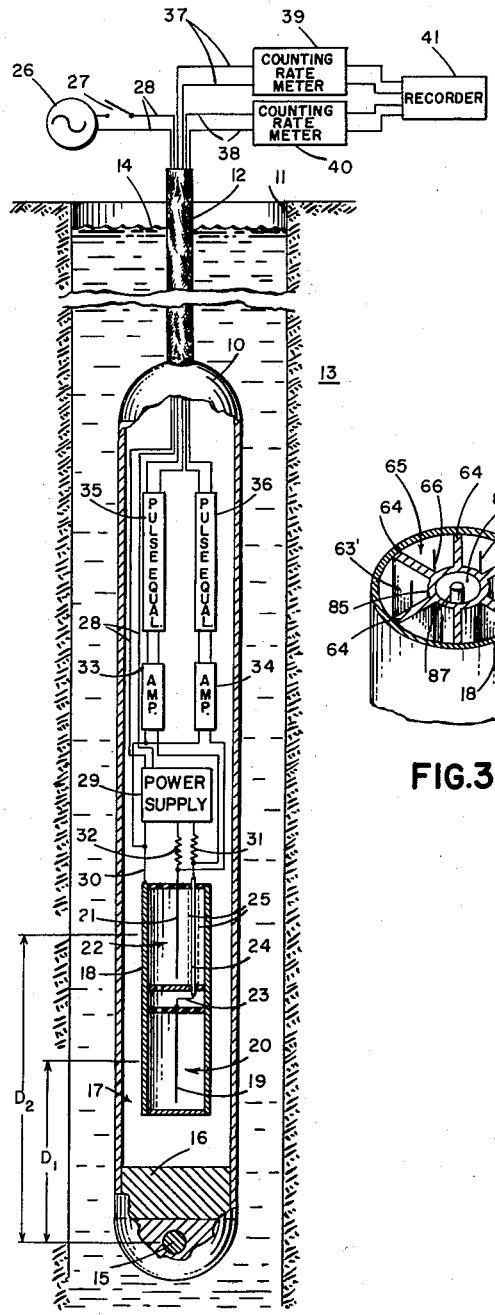
FIG.1
FIG.3
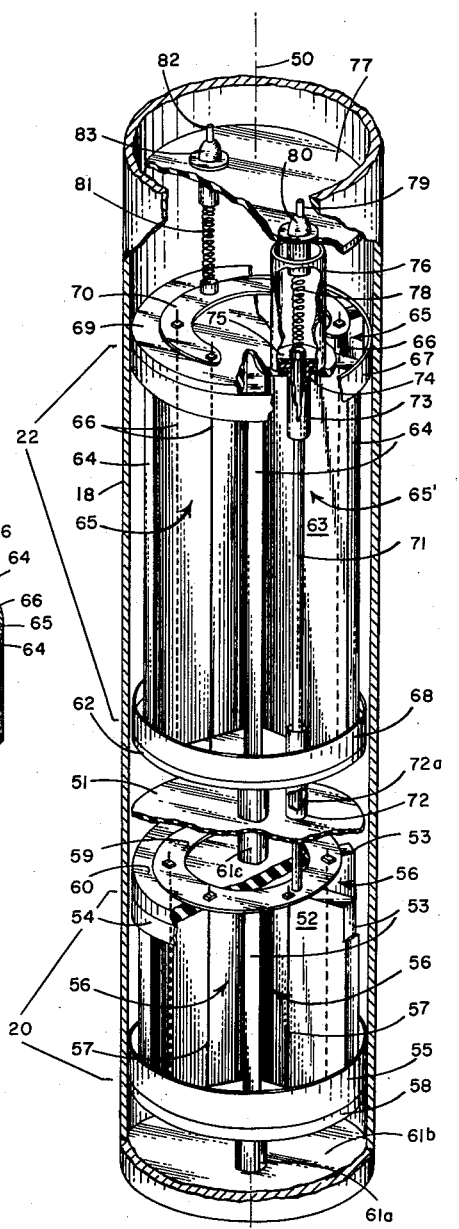
FIG.2
INVENTORS.
JOHN T. DEWAN.
WILLIAM D. LUNN.
BY *Robert Hockfield*
THEIR ATTORNEY.

2,967,244

WELL LOGGING APPARATUS

John T. Dewan, Houston, and William D. Lunn, Bellaire, Tex., assignors, by mesne assignments, to Schlumberger Well Surveying Corporation, Houston, Tex., a corporation of Texas Filed Jan. 16, 1956, Ser. No. 559,488

9 Claims. (Cl. 250—83.6)

This invention relates to well logging apparatus and, more particularly, pertains to new and improved radioactivity logging apparatus incorporating a unique radiation responsive device for obtaining a log of radiant energy emanating under induced conditions from the earth formations traversed by a well or a borehole.

As used herein the term "radiant energy" is intended to denote either wave or particle energy. Accordingly, gamma rays, neutrons, and charged particles are all deemed to be within the scope of the expression "radiant energy." Moreover, "induced" or "resulting" radiant energy is intended to signify radiant energy emanating from a material in response to incident radiant energy. Such phenomena as the generation of gamma rays by the material as a result of bombardment by and the capture of incident neutrons, and the production of neutrons of lower energy caused by elastic collisions between incident neutrons and particles of the material are considered exemplary of "induced" or "resulting" radiant energy.

One variety of radioactivity well logging apparatus presently in use includes a source for irradiating the earth formations with neutrons, some of which are slowed and captured thereby inducing gamma radiation. The apparatus also includes a gamma ray detector, and by continuously recording the counts per unit time in the detector output as the equipment traverses the borehole, a log is obtained providing useful information regarding certain qualities, such as hydrogenous fluid content, of the earth formations.

It has been found that by making logs with different spacings between the source and detector, a more reliable indication of fluid content may be provided. For example, the equipment may be adjusted so that the two curves obtained for long and short spacings coincide in shale sections and in water bearing sands of intermediate porosity. In general, then, the two curves will coincide in all formations except gas-bearing sands and very tight sections, in which places the long-spacing curve has an appreciably higher deflection than the short-spacing curve. Thus, in exploring a borehole which does not traverse tight zones, a separation between the two curves is directly indicative of the presence of gas.

Obviously, the foregoing procedure can be facilitated by running the two curves simultaneously through the use of a logging instrument including a source of neutrons and a pair of detectors differently spaced from the souce. This may result in constructional problems where, for example, a pair of axially spaced Geiger counters are positioned within the narrow confines of a borehole instrument. In particular, energization voltages on the order of 1,000 volts must be applied to each of the counters and pulse-type signals from each must be derived with a minimum of cross-coupling. These requirements preferably should be met without undesirably increasing the size of the logging instrument.

It is, therefore, an object of the present invention to provide new and improved logging apparatus of the radioactivity type including two detectors which is relatively compact and yet is entirely efficient and reliable in operation.

Another object of the present invention is to provide a new and improved radiation responsive device including two-essentially separate counting volumes to which electrical connections may be made in a relatively easy manner.

A further object of the present invention is to provide a new and improved radiation responsive device including a fluid tight envelope of generally long and narrow configuration and containing a pair of essentially separate counting volumes to which connections may be individually made via one end of the envelope.

A radiation responsive device in accordance with the present invention comprises a fluid tight envelope containing an ionizable medium and constituting a counting volume. An electrode extends through the envelope and thus is exposed to the ionizable medium. Means associated with the electrode defines a radiation responsive or active discharge gap. The device further comprises an electrical conductor extending through the envelope in electrically shielded relation with respect to the electrode. The conductor is exposed to the ionizable medium, but it is not part of a discharge gap and hence it may be employed for conveying an electrical signal entirely independently of the active discharge gap. For example, an electrode of another counting volume in the same or another envelope may be connected to the conductor.

The novel features of the present invention are set forth with particularity in the appended claims. The present invention, both as to its organization and manner of operation, together with further objects and advantages thereof, may best be understood by reference to the following description taken in connection with the accompanying drawing in which:

Fig. 1 is a schematic representation, partly in vertical section, of radioactivity logging apparatus constructed in accordance with the present invention shown in operative relation within a borehole drilled into the earth;

Fig. 2 is a perspective view of a radiation responsive device illustrated schematically in Fig. 1, proportions of which have been cut away to reveal various interior details; and Fig. 3 represents a modification which may be made to the device shown in Fig. 2.

In Fig. 1 of the drawing, there is shown radioactivity well logging apparatus incorporating a radiation responsive device embodying the present invention. The apparatus includes a housing 10 supported in a borehole 11 by a cable 12 which may be used in cooperation with a winch (not shown) to lower and raise housing 10 in the usual manner. Borehole 11 traverses earth formations 13 and may be dry or may be filled with a water-base or oil-base drilling mud 14, as shown.

Supported at the lowermost end of housing 10 is a source of radiant energy 15 which may, for example, be comprised of a mixture of radium and beryllium from which neutrons emanate. A gamma ray shield 16, which may be composed of lead, is disposed above source 15 and a radiant energy responsive device 17 or gamma ray detector embodying the present invention is supported above the shield.

Radiation responsive device 17 includes a cylindrical, essentially fluid-tight envelope 18 constructed of an electrically conductive material disposed with its longitudinal axis extending in substantially the same direction as the longitudinal axis of housing 10. Envelope 18 contains an ionizable medium which may, for example, be comprised of a mixture of argon and a trace of ammonia, on the order of 1¾% by volume, at a pressure on the order of twenty-nine inches of mercury.

A first electrode wire 19 extends through a lower portion 20 of envelope 18 spaced a mean distance, $D_1$, from source 15 along the axis of housing 10. Obviously, the inner wall of envelope 18 and electrode wire 19 are exposed to the ionizable medium and thus constitute a first discharge gap.

A second electrode wire 21 extends through an upper portion 22 of envelope 18 spaced from source 15 a mean distance, $D_2$, larger than distance $D_1$. It is evident that the inner wall of envelope 18 and electrode 21 are exposed to the ionizable medium and thus constitute a second discharge gap.

An electrical connection 23 extends from the upper end of electrode 19 to the lower end of an electrically conductive rod 24 that passes through upper portion 22 of envelope 18. As illustrated by the dashed lines 25, conductor 24 is electrically shielded with respect to electrode 21. The size and configuration of electrode 24 and its shield 25 are arranged to minimize the possibility of an electric discharge therebetween.

It is thus evident that two separate gamma ray counting volumes are provided in envelope proportions 20 and 22. To energize the two counters, a source of alternating potential 26 at the surface of the earth is connected via an operating switch 27 and electrically insulated conductors 28 of cable 12 to a power supply 29 within housing 10. The power supply 29 may be of conventional construction for converting the applied alternating potential to a unidirectional potential having a value on the order of 1,000 volts. This potential is supplied to the counter in portion 20 of envelope 18 via a connection 30 extending from one terminal of the power supply to envelope 18; an isolating resistor 31 connects another terminal of the power supply to the upper end of conductor 24 which, as pointed out hereinbefore, is electrically connected to electrode 19. Another isolating resistor 32 extends between power supply 29 and the upper end of electrode 21. The exact value of the unidirectional potential applied to the counters is selected in a known manner so that each operates in the Geiger region. Accordingly, an independent discharge occurs in each counter in response to an incident quanta of gamma radiation and such a discharge is relatively quickly extinguished through self-quenching action. If desired, however, circuits for separately quenching the Geiger counters may be employed.

In order to derive the respective electrical pulse signals representing radiant energy incident on each of portions 20 and 22 of envelope 18, an extension of lead 30 is connected to the input circuits of a pair of amplifiers 33 and 34. The remaining input terminal of amplifier 33 is connected to the junction between resistor 31 and conductor 24, while the remaining input terminal of amplifier 34 is connected to the junction between resistor 32 and electrode 21. The amplifiers are coupled to respective pulse equalizers 35 and 36 of conventional construction, in turn coupled by conductor pairs 37 and 38 of cable 12 to respective counting rate meters 39 and 40. These may be constructed in a known manner so that each derives a voltage having a magnitude dependent upon the time rate of occurrence of the pulses supplied to it and the resulting voltages from both meters are applied to a recorder 41. The recording medium in recorder 41 is transported in proportion to movement of housing 10 through borehole 11.

While a radiation responsive device embodying the present invention may be employed to provide any of a variety of pairs of source-detector spacings, $D_1$ and $D_2$, in a practical arrangement featuring the invention, spacings of 17½ inches and 23 inches have been employed for $D_1$ and $D_2$ respectively.

In operation, housing 10 is passed through borehole 11 with switch 27 closed and source 15 irradiates formations 13 with neutrons. Some of the neutrons are captured by material within the formations (usually it is hydrogenous fluids) and, in response to each such capture a quantum of gamma radiation is emitted. A part of the induced radiant energy is returned to the housing 10 and some of it impinges upon the radiant energy detectors within the portions 20 and 22 of envelope 18. Geiger discharges occur in each counting volume and the resulting pulse-type electrical signals are amplified in amplifiers 33 and 34 and each of pulse equalizers 35 and 36 supplies trains of pulses of uniform amplitude and duration to counting rate meters 39 and 40, respectively. Consequently, two potentials are derived at the counting rate meters representing the intensity of the gamma radiation incident on the two counters and these potentials are simultaneously recorded in recorder 41.

It is, therefore, evident that the required two-spacing record may be obtained from which the desired information concerning the nature of the fluids in formations 13 may be derived.

Turning now to Fig. 2 illustrating the constructional details for a two-spacing counter of the type schematically illustrated in Fig. 1, it will be observed that like elements are represented by the same reference characters.

The longitudinal axis of cylindrical envelope 18 is denoted by a broken line 50 and portions 20 and 22 of the envelope are spaced apart along this axis. These portions of the envelope are effectively separated from another by a conductive disc 51 arranged perpendicularly to axis 50.

Extending longitudinally through portion 20 of envelope 18 is a first electrode structure 52 comprised of a plurality of fins 53 that project radially from axis 50. A pair of conductive rings 54 and 55 are fastened to respective upper and lower end portions of the fins 53 in coaxial alignment with respect to axis 50. Upper ring 54 is slightly smaller than the inner diameter of envelope 18, but the lower ring is in engagement with the inner wall of the envelope and connects the fins to the envelope.

Fins 53 define a plurality of similar compartments 56 and a plurality of electrodes 57 in the form of elongated wires are disposed in respective ones of these compartments. The lower ends of the wires 57 terminate at an insulating disc 58 secured at the underside of ring 55 and their upper ends terminate at an electrically conductive flat ring 59 supported at the upper surface of an insulating disc 60, in turn, secured at the upperside of band 54. It is thus seen that the electrodes 57 are electrically connected together and each electrode together with the adjacent pair of fins 53 and an adjacent wall portion of envelope 18 forms a discharge gap corresponding to the discharge gap defined in Fig. 1 in connection with electrode 19.

A post 61a rests on a lower closure 61b for envelope 18 to support structure 52 while another post 61c extends along axis 50 from the upper end of electrode structure 52 through corresponding openings in insulator 60, disc 51 and another insulator 62. Post 61c terminates at the lower end of another electrode structure 63 extending longitudinally through envelope portion 22. Structure 63 is generally similar to electrode structure 52 and includes a plurality of fins 64 that project radially from axis 50 to define a plurality of similar compartments 65 exposed to the ionizable medium within envelope 18. A plurality of electrode wires 66 are disposed in respective ones of compartments 65 with the exception of one compartment designated 65'. Conductive rings 67 and 68 encompass the upper and lower extremities of the fins 64, respectively. Upper ring 67 is smaller than envelope 18, however, lower ring 68 is large enough to connect fins 64 to the envelope. An insulating disc 69 is secured above band 67. A C-shaped member 70 of conductive material is fixed to the upper surface of insulator 69 with the extremities of the C terminating at the planes of the pair of fins 64 defining compartment 65'. Member 70 serves as a termination for electrode wires 66 which are thereby electrically connected together. Each of the wires 66 and the adjacent pair of fins together with the adjacent surface portion of envelope 18 constitute a discharge gap similar to the one described in connection with electrode 21 in Fig. 1.

In order to complete an electrical connection to electrode wires 57, an electrically conductive rod 71 is connected to ring 59 and passes through an opening 72 in disc 51 and an opening (not shown) in insulating disc 62, and extends through compartment 65'. A conductive sleeve 72a secured to disc 51 extends coaxially with respect to rod 71 through the opening in disc 62 and for a short distance into compartment 65'. Another sleeve 73 extends coaxially along the upper end of conductor 71 and through an opening 74 in insulating disc 69, and an insulating spacer 75 maintains the upper end of conductor 71 in coaxial position with respect to sleeve 73. Sleeve 73 has an enlarged portion 76 extending from the upper surface of insulating disc 69 to a point just below a conductive closure 77 for the upper end of envelope 18.

Extending through sleeve portion 76 is a flexible electrical connection 78 having one end connected to the upper end of conductor 71 and the other end connected to a lead 79 associated with a sealed feed-through insulator 80. Similarly, a flexible electrical connection 81 extends between conductive member 70, and an electrical conductor 82 associated with a sealed feed-through insulator 83. It is thus seen that the counter in envelope portion 20 may be coupled to an electrical circuit by connections to lead 79 and to housing 18, while connections to lead 82 and housing 18 serve to couple the counter in envelope portion 22 with an electrical circuit.

In constructing the radiation responsive device illustrated in Fig. 2, the size of compartments 56 and electrode wires 57 and the size of compartment 65 and electrode wires 66 are arranged in a known manner so that under a given pressure of the ionizable medium within the envelope, incident radiant energy causes an electric discharge to occur. In contrast, however, the size of electrical conductor 71 in connection with the size of compartment 65' is arranged so that ionization cannot occur therebetween. These conditions may be met with the use of published data. For example, information for this purpose may be obtained in the text entitled "Ionization Chambers and Counters" by Wilkinson published by the Cambridge University Press in 1950 at pages 178 and 179 and with reference to Fig. 56.

From the construction illustrated in Fig. 2 it is obvious that in a radiation responsive device embodying the present invention conductor 71 is completely shielded by the adjacent pair of plates or fins 64 and the adjacent wall portion of envelope 18 defining compartment 65'. Further shielding, of course, is provided by conductive sleeves 72 and 73. These shields prevent any part of one counter which is at high potential from being exposed to any part of the other counter at high potential. Accordingly, cross-coupling between the two sections is minimized. This is particularly important in an application where the counters are separately quenched and large quench voltages must be applied after a discharge in either section.

Each of the counters in envelope portions 20 and 22 responds individually to incident radiant energy so that independent Geiger discharges occur. Conductor 71, of course, is too large in diameter to support a Geiger discharge and thus even through it extends through portion 22 of envelope 18, the independent operation of the two counters is not adversely affected.

The radiation responsive device of Fig. 2 may be incorporated in the circuit of Fig. 1 by means of an electrical connection to envelope 18 and electrical connections to conductors 79 and 82. In other words, connections for both counters may be made at one end section of envelope 18, and there is no need for a heavily insulated conductor to extend along the envelope. Thus, the logging instrument incorporating the device of Fig. 2 may be relatively compact.

In a particular construction embodying the present invention, the following physical characteristics were employed:

| Element | Size | Material |
| --- | --- | --- |
| Envelope 18 | 13½" long x 2" O.D. x ⅟₁₆" thick. | Brass. |
| Electrode structure 52 | 4" long | Do. |
| Fins 53 | Six equally spaced, ¾" deep. | Do. |
| Electrode structure 63 | 5½" long | Do. |
| Fins 64 | Six equally spaced, ¾" deep. | Do. |
| Electrode wires 57 and 66 | .003" diameter | Tungsten. |
| Conductive rod 71 | ⅟₁₆" diameter | Copper. |

The foregoing is presented only by way of illustration and in no way should be construed as limiting the scope of the invention since any of a variety of sizes and materials may be appropriately employed for the several elements. For example, aluminum, copper, steel or a variety of metals may be used.

From the foregoing description it is evident that a radiation responsive device embodying the present invention is relatively simple to construct and extremely compact, yet it provides two counting volumes that are entirely independent and reliable in operation.

While both of the portions 20 and 22 of envelope 18 have been stated as including counters responsive to incident gamma radiation, obviously the device may be appropriately modified so that either or both of the counters responds to another type of radiant energy. This may be done, for example, by enclosing a portion of the envelope defining one of the counting volumes with an appropriately shaped body of cadmium or a boron-containing member. Accordingly, that counting volume becomes responsive to neutrons. In this way it is possible to provide both gamma ray and neutron counters spaced at different distances from the source 15 (Fig. 1).

Furthermore, the length of the counting volumes may be arranged in any desired manner. Thus, they may be of equal lengths or of different lengths, as shown.

In Fig. 3 a modified electrode structure 63' is illustrated for the radiation responsive device shown in Fig. 2. The modified structure includes a central section 85 of cylindrical configuration extending along longitudinal axis 50 and defining a shield enclosure 86 exposed to the ionizable medium within envelope 18. Fins 64 extend radially from central section 85 to define the similar compartments 65, all of which house respective ones of electrically connected, elongated electrodes 66.

Instead of post 61 shown in Fig. 2, an appropriate insulating terminal is provided for the lower end of an electrical conductor in the form of a rod 87 that extends along axis 50 through shield enclosure 86. The lower end of rod 87 (not shown) is connected to conductive ring 59 (Fig. 2) in any suitable manner.

It is evident that by appropriately choosing the inner diameter of enclosure 86 and the outer diameter of rod 87, the electric field in the vicinity of the rod is too low to support a Geiger discharge. Moreover, central portion 85 of electrode structure 63' serves to shield the conductor from the electrodes 66. Accordingly, the type of operation described in connection with Fig. 2 is obtained.

In either of the arrangements described in Figs. 2 or 3, it is important that the conductor 71 or 87, as the case may be, have a relatively low capacity to housing 18. This is understandable since the signal strength of the resulting pulses transmitted via this conductor is inversely proportional to the capacitance value as is well known.

Although the invention has been described in connection with a single envelope defining two counting volumes, other applications are contemplated. For example, the two counting volumes 20 and 22 (Fig. 2) may be separate; i.e., each can be within an independent gas-tight envelope. Alternatively, the upper volume alone may be used and another source of signals may be coupled to envelope 18 and the lower end of rod 71. In the latter case, a signal other than obtained in response to radiation may be conveyed.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

We claim:

1. Apparatus for investigating earth formations traversed by a borehole comprising: a support adapted to be passed through the borehole and having a longitudinal axis; a source of radiant energy carried by said support for irradiating the formations; a radiation responsive device carried by said support for converting resulting radiant energy to electrical signals, said radiation responsive device including fluid tight envelope means defining two counting volumes of an ionizable medium spaced from said source along said axis at different distances, a first electrode extending through one of said counting volumes, a second electrode extending through the other of said counting volumes, an electrical conductor connected to said first electrode and extending through said other counting volume in electrically shielded relation with respect to said second electrode, said electrical conductor being exposed to said ionizable medium, but incapable of sustaining an electric discharge; and means coupled to each of said first and said second electrodes for deriving respective electrical signals representing radiant energy incident on each of said portions of said envelope.

2. Apparatus for investigating earth formations traversed by a borehole comprising a support adapted to be passed through the borehole and having a longitudinal axis; a source of radiant energy carried by said support for irradiating the formations; a radiation responsive device carried by said support for converting resulting radiant energy to electrical signals, said radiation responsive device including a cylindrical fluid tight envelope of electrically conductive material disposed with its longitudinal axis extending in essentially the same direction as the longitudinal axis of said support, an ionizable medium contained by said envelope, a first electrode extending through one portion of said envelope spaced from said source along said axis of said support a given distance and exposed to said ionizable medium, a second electrode extending through another portion of said envelope spaced from said source along said axis of said support a distance other than said given distance and exposed to said ionizable medium, an electrical conductor connected to said first electrode and extending through said other portion of said envelope in electrically shielded relation with respect to said second electrode, said electrical conductor being exposed to said ionizable medium; means coupled to said envelope and to each of said first and said second electrodes for deriving respective electrical signals representing radiant energy incident on each of said portions of said envelope; and means for obtaining a record of each of said electrical signals as a function of the depth of said support in the borehole.

3. A radiation responsive device comprising: a fluid tight envelope; an ionizable medium contained by said envelope; an electrode extending through said envelope and exposed to said ionizable medium; means associated with said electrode to define an active electric discharge gap; and an electrical conductor extending through said envelope, and thereby exposed to said ionizable medium, in electrically shielded relation with respect to said electrode and incapable of sustaining an electric discharge.

4. A radiation responsive device comprising: envelope means defining two counting volumes of an ionizable medium; a first electrode exposed to said ionizable medium in one of said counting volumes; a second electrode exposed to said ionizable medium in the other of said counting volumes; and an electric conductor connected to said first electrode and extending through said other counting volume in electrically shielded relation with respect to said second electrode, said electrical conductor being exposed to said ionizable medium but incapable of sustaining an electric discharge.

5. A radiation responsive device comprising: a fluid tight envelope; an ionizable medium contained by said envelope; means extending through one portion of said envelope and defining a first discharge gap exposed to said ionizable medium; means extending through another portion of said envelope and defining a second discharge gap exposed to said ionizable medium; an electrical conductor connected to at least a portion of said first discharge gap and extending through said other portion of said envelope, said electrical conductor being exposed to said ionizable medium; and a shield coextensive with said electrical conductor, the size and configuration of said electrical conductor and said shield being such as to minimize the possibility of a gaseous discharge therebetween.

6. A radiation responsive device comprising: an electrically conductive fluid tight envelope; an ionizable medium contained by said envelope; a first electrode extending through one portion of said envelope and exposed to said ionizable medium, said first electrode and the inner wall of said envelope defining, at least in part, a first discharge gap; a second electrode extending through another portion of said envelope and exposed to said ionizable medium, said second electrode and the inner wall of said envelope defining, at least in part, a second discharge gap; and an electrical conductor connected to said first electrode and extending through said other portion of said envelope in electrically shielded relation with respect to said second electrode, said electrical conductor being exposed to said ionizable medium.

7. A radiation responsive device comprising: a fluid tight envelope having a longitudinal axis; an ionizable medium contained by said envelope; an electrically conductive electrode structure disposed in one portion of said envelope and including a plurality of compartments extending in the same direction as said axis and exposed to said ionizable medium; a plurality of electrically connected electrodes individually extending through respective ones said compartments; another electrically conductive electrode structure disposed in another portion of said envelope and including a plurality of compartments extending in the same direction as said axis and exposed to said ionizable medium; a plurality of electrically connected electrodes individually extending through respective ones of said compartments of said other electrode structure with the exception of a particular one of said compartments; and an electrical conductor connected to one of said electrodes associated with said first-mentioned electrode structure and extending through said particular compartment of said other electrode structure and thereby being electrically shielded with respect to said electrodes associated with said other electrode structure, said electrical conductor being exposed to said ionizable medium.

8. A radiation responsive device comprising: a cylindrical, electrically conductive, fluid tight envelope having a longitudinal axis; an ionizable medium contained by said envelope; a first electrode structure disposed in one portion of said envelope and including a plurality of fins extending radially from said axis to define a plurality of similar compartments exposed to said ionizable medium; a plurality of electrically connected, elongated electrodes, each disposed in one of said compartments; a second electrode structure disposed in another portion of said envelope longitudinally displaced from said first-mentioned portion, said second electrode structure including a plurality of fins extending radially from said axis to define a plurality of similar compartments exposed to said ionizable medium; a plurality of electrically connected, elongated electrodes, each disposed in one of said compartments of said second electrode structure, with the exception of a particular compartment; means for electrically connecting said first and said second electrode structures to said envelope; and an electrical conductor connected to one of said electrodes associated with said first electrode structure, extending through said particular compartment of said second electrode structure and having an area in a plane transverse to said longitudinal axis larger than the corresponding areas of said elongated electrodes associated with said second electrode structure, said electrical conductor being exposed to said ionizable medium.

9. A radiation responsive device comprising: a cylindrical, electrically conductive, fluid tight envelope having a longitudinal axis; an ionizable medium contained by said envelope; a first electrode structure disposed in one portion of said envelope and including a plurality of fins extending radially from said axis to define a plurality of similar compartments exposed to said ionizable medium; a plurality of electrically connected, elongated electrodes, each disposed in one of said compartments; a second electrode structure disposed in another portion of said envelope longitudinally displaced from said first-mentioned portion, said second electrode structure including a central section of hollow, cylindrical configuration extending along said longitudinal axis to constitute a shield enclosure exposed to said ionizable medium, and a plurality of fins extending radially from said central section to define a plurality of similar compartments exposed to said ionizable medium; a plurality of electrically connected, elongated electrodes, each disposed in one of said compartments of said second electrode structure; means for electrically connecting said first and said second electrode structures to said envelope; and an electrical conductor connected to one of said electrodes associated with said first electrode structure extending through said shield enclosure, said electrical conductor being exposed to said ionizable medium.

References Cited in the file of this patent

UNITED STATES PATENTS

| | | |
|---|---|---|
| 2,508,772 | Pontecorvo | May 23, 1950 |
| 2,531,804 | Carlin et al. | Nov. 28, 1950 |
| 2,699,513 | Watt | Jan. 11, 1955 |
| 2,741,709 | Tirico et al. | Apr. 10, 1956 |